(12) United States Patent
Göcke et al.

(10) Patent No.: US 12,534,962 B2
(45) Date of Patent: Jan. 27, 2026

(54) THREADED CONNECTION

(71) Applicant: TRACTO-TECHNIK GmbH & Co. KG, Lennestadt (DE)

(72) Inventors: Frank Göcke, Lennestadt (DE); Tobias Klein, Lennestadt (DE); Dieter Wurm, Kirchhundem (DE)

(73) Assignee: TRACTO-TECHNIK GmbH & Co. KG, Lennestadt (DE)

( * ) Notice: Subject to any disclaimer, the term of this patent is extended or adjusted under 35 U.S.C. 154(b) by 0 days.

(21) Appl. No.: 18/413,212

(22) Filed: Jan. 16, 2024

(65) Prior Publication Data
US 2024/0384605 A1 Nov. 21, 2024

(30) Foreign Application Priority Data

Jan. 17, 2023 (EP) ..................................... 23152005

(51) Int. Cl.
*E21B 17/03* (2006.01)
*E21B 17/042* (2006.01)

(52) U.S. Cl.
CPC ............ *E21B 17/042* (2013.01); *E21B 17/03* (2013.01)

(58) Field of Classification Search
CPC ...... E21B 17/03; E21B 17/042; F16L 15/001; F16L 15/06
See application file for complete search history.

(56) References Cited

U.S. PATENT DOCUMENTS

| | | | |
|---|---|---|---|
| 2,909,380 A | 10/1959 | Hoye et al. | |
| 3,794,092 A | 2/1974 | Carlson et al. | |
| 4,892,337 A * | 1/1990 | Gunderson | E21B 17/085 285/332 |
| 7,210,710 B2 * | 5/2007 | Williamson | E21B 17/042 285/333 |
| 9,080,394 B2 * | 7/2015 | Koch | E21B 17/042 |
| 10,041,307 B2 * | 8/2018 | Muradov | E21B 17/042 |
| 11,125,361 B2 * | 9/2021 | Dziekonski | F16L 15/06 |
| 2003/0075924 A1 | 4/2003 | Olivier | |
| 2004/0195835 A1 | 10/2004 | Noel et al. | |
| 2013/0277963 A1 * | 10/2013 | Carrois | F16L 15/006 285/333 |
| 2015/0035273 A1 * | 2/2015 | Moore | E21B 17/042 285/333 |

FOREIGN PATENT DOCUMENTS

| | | |
|---|---|---|
| CN | 108252660 A | 7/2018 |
| CN | 108756771 A | 11/2018 |
| CN | 109882088 A | 6/2019 |
| DE | 3114651 A1 | 2/1982 |

* cited by examiner

*Primary Examiner* — Matthew R Buck
(74) *Attorney, Agent, or Firm* — Leason Ellis LLP

(57) ABSTRACT

The invention relates to a threaded plug on an elongated body for a threaded connection to a threaded bushing, wherein the threaded plug has a conical external thread, in which a section of a flank of the external thread can be represented as a section of a function which has a curvature, wherein the section of the function has an angle to a connecting line of adjacent thread bases or thread tips that is greater than 45° over a height of at least 0.3 times the thread height.

19 Claims, 4 Drawing Sheets

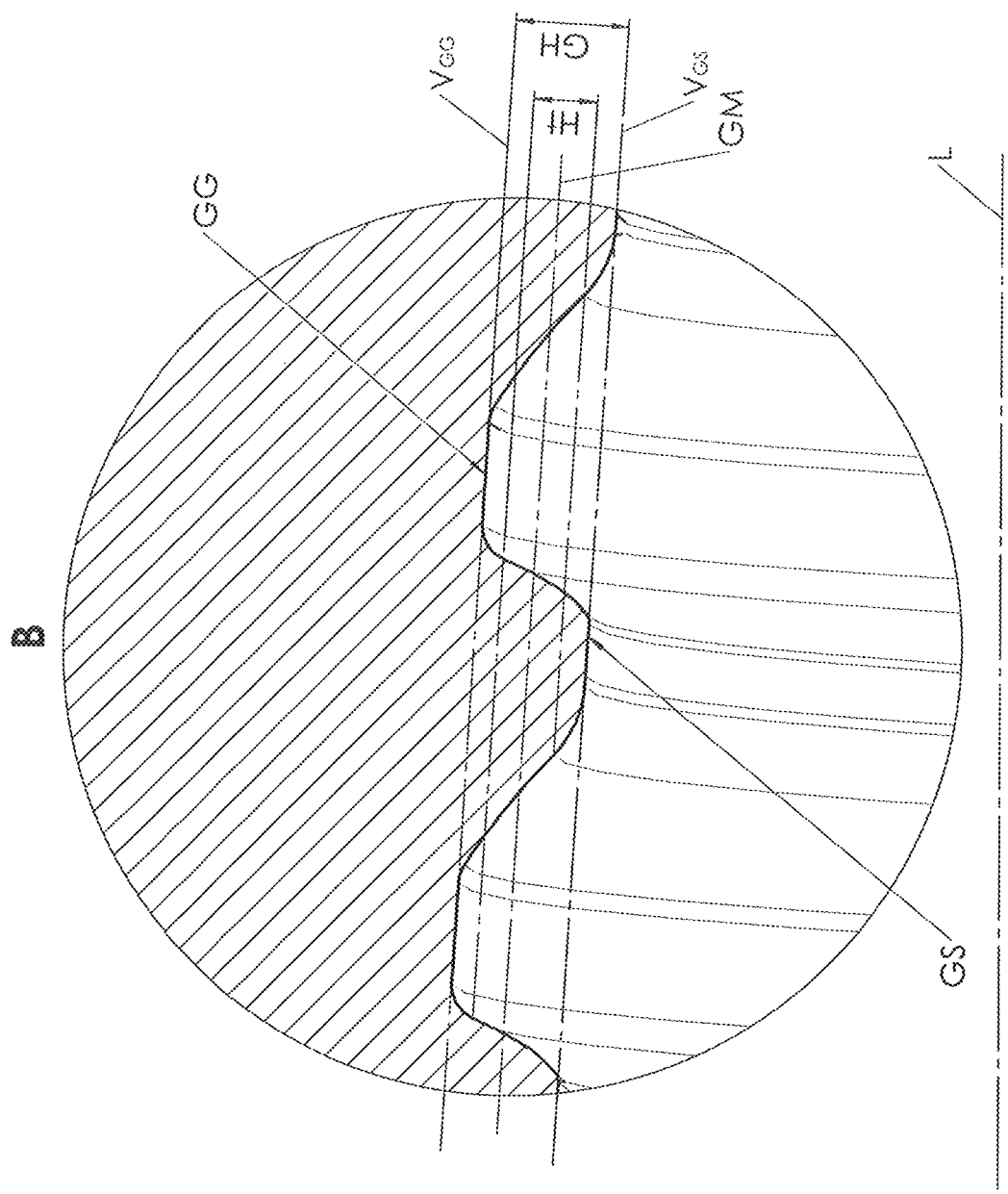

THREADED CONNECTION

The invention relates to a threaded plug, a threaded bushing, a use of a threaded plug, a use of a threaded bushing and a threaded connection having a threaded plug and a threaded bushing, wherein the described entities can be designed for an earth drilling device.

The term "earth drilling device" is understood to mean devices using which drive power from a drive device is transmitted via a rod to a tool that is arranged on a rod, in particular at the end. This includes, in particular, earth drilling devices using which earth bores and in particular horizontal bores are drilled into the ground. In this case, thrust or pressure forces are generally transmitted from the drive device via the rod to the tool designed as a drill head. It is also possible that a rotational movement can be applied to the rod around its longitudinal axis by means of the earth drilling device. Using the earth drilling devices, existing bores in the ground or old pipes that have already been laid can be expanded or pulled out and, if necessary, a new pipe can be pulled in at the same time. The earth drilling devices are often designed in such a way that they can be used both for creating earth bores and for pulling work, i.e., for expanding an existing bore or an old pipe or for pulling in a new pipe. This makes it possible to first create a pilot bore using the same earthwork device, wherein a pilot drill head is pushed through the ground until it reaches a target excavation pit, and the pilot drill head in the target excavation pit is replaced by an expansion head, wherein the pilot bore is expanded when the drill rod is retracted. If necessary, a new pipe attached to the expansion head can be pulled into the expanded borehole at the same time as the expansion head.

The rod of such earthwork devices regularly consists of a plurality of rod sections, which are gradually connected to one another in accordance with the drilling advance. The individual rod sections are connected via coupling elements, wherein screw connections in particular are widely used in addition to plug-in couplings, as described in DE 196 08 980. The essential advantages of screw connections are the low costs associated with their production and the possibility of having the screwing carried out easily in an automated manner. An essential disadvantage of screw connections, however, is that they often represent the largest weak points of the rod, which is to be attributed to the relatively small diameter in the area of the threaded plug of the threaded connection and to the geometrically related high notch effect of the thread itself.

A threaded connection is known from EP 2 334 892 B1, in which the external thread of a threaded plug is designed such that flanks of this external thread form a section of an ellipse. By forming the flanks in the form of a section of an ellipse, a constantly changing flank angle is achieved, by which optimized contact between the flanks of the threaded plug and the corresponding flanks of an internal thread of a corresponding threaded bushing can be achieved. Threaded plug and threaded bushing are designed correspondingly.

API threads and round threads in accordance with DIN 20 400 are also known. However, the service life of such thread shapes has proven to be too short in the daily operation of earth drilling devices.

Alternative thread shapes have therefore been developed that are specially designed for the specific loads of the rod that occur in earth drilling devices. DE 198 03 304 A1 discloses a threaded connection using which rod sections of a drill pipe are to be connected, wherein the drill rod is intended to be used in particular for rotary impact drilling. The essential special features of these threaded connections are the asymmetrical shape of the thread having different pitch angles of the load-bearing and non-load-bearing flanks in rotary impact drilling operation, as well as the provision of a threadless insertion section. The non-load-bearing flanks are also to be designed in the shape of a circular arc. The threaded connection known from DE 198 03 304 A1 has also proven to be insufficiently robust in daily operation.

Asymmetrical threaded connections are also known from EP 0 324 442 B1 and U.S. Pat. No. 5,060,740, which were designed for use for connecting rod sections of earth drilling devices. The threaded connections disclosed in these publications are characterized in that the thread base forms a section of an ellipse. This is intended to enable a transition from the thread base into the flat flanks of the thread that is as free from notch effects as possible.

Threaded connections for rods of earth drilling devices are also known from WO 2006/092649 A1, in which the thread base forms a section of an ellipse. The thread shapes disclosed in this publication can be designed both asymmetrically and symmetrically.

Although good results are achievable in particular using the thread shape known from EP 2 334 892 B1, it has been shown that forming and releasing the connection requires more precise handling.

Based on this prior art, the invention was therefore based on the object of creating a threaded connection which in particular facilitates the formation and release of the connection and the service life of which is impaired as little as possible or not at all.

The object is achieved by the subjects of the independent claims. Advantageous embodiments are the subject matter of the respective dependent claims and result from the following description of the invention.

According to the core concept of the invention, the idea of only having to take into consideration a reduction in the notch effect and of wanting to achieve a more homogeneous stress distribution was abandoned, which is why an elliptical shape was previously provided at the thread base. Due to the elliptical shape, the stress maxima occurred less in the thread base than in the area of the flanks. Until now, the perfect thread shape had been assumed to be a simple elliptical design, as this had a positive effect on the service life of the threaded connection. Particularly in the field of rod sections for earth drilling devices, the ellipse shape has been retained. The considerations were based on the fact that there was generally no geometric notch in the area of the flanks and the notch effect in the thread base was thereby reduced. According to the invention, it has now been recognized that it is not only the thread base and an extension to the further flank course that are important, but also a design of the flank in the further course spaced apart from the thread base. The invention is based on a section of the flank in which the tangent applied to a respective point of the section has an angle in relation to the cone to which the thread is applied that is greater than 45°. The invention expands or changes the design of at least one section of the flank to adapt the geometry of the flank as such, wherein according to the invention in particular a section of the flank coming into contact with the other screw element is considered. According to the invention, the design of the flanks for a threaded plug and/or a threaded bushing was changed in such a way that the shape of an ellipse was removed. According to the core concept of the invention, the section of the flank is curved and has a significant proportion of the thread height, in which the angle in relation to a connecting line of adjacent thread bases and/or thread tips is greater than 45°. This makes it possible to obtain efficient force transmission of the screw connection, wherein the advantageous properties of a shape curved at least in the section of the flank can be used. The function creates the possibility of extending the shape down to the thread base or close to the thread base in order to reduce tensions in the thread base.

According to the core concept of the invention, an approach completely different from the prior art is chosen. While in the prior art the shape of the thread base was extended to the flank in the direction of a thread tip, in the present case the shape of the flank can be extended to the thread base. Surprisingly, it has been shown that the shape provided for the flank also enables an improvement in reducing stresses in the thread base. Improved force transmission, improved sliding, and/or a reduction in the stresses in the thread base can be achieved, so that on the one hand it is possible to counteract damage to the thread due to shearing or deteriorated thread guidance, which is colloquially referred to in general as cold welding of the thread, and/or a notch effect in the thread base.

At first it seems paradoxical that a screw connection, which has been known for decades and the main function of which is to elastically clamp two parts by means of form fit and frictional locking, is not already known, as proposed here, but the previous good results have established retaining the previously used shapes, in particular the ellipse shape.

By means of the shape mentioned, the operating forces and operating torques can be reliably absorbed and the screw connection can be made more successful, and an easily constructed thread form, the production or manufacture of which can surprisingly be carried out without major difficulties, can be used.

Especially for a conical thread, it was recognized according to the invention that a force, which is perceptible as a "pre-tension", is present, since a gap exists between the threaded bushing and the threaded plug upon the initial screwing together, even though the threads of the threaded bushing and the threaded plug already rest on one another congruently. During further screwing together, a resulting normal force is generated, which increases the frictional force in the thread. This can result in part of the screwing torque being absorbed by the friction. The overlap, which is already present upon the initial screen together, results in sliding of the threaded bushing and the threaded plug in relation to one another, since the "pre-tension" in the axial direction causes a radial movement due to the cone angle. In order that the sliding can take place with as much contact as possible in order to distribute the surface pressure accordingly, it was recognized that the shape of the thread is to be designed with a significant section in the thread height, the tangents of which in the area enclose an angle with a connecting line of adjacent thread bases or thread tips which is greater than 45°. The area having an "incline" of more than 45° has a height which corresponds to at least 0.3 times the thread height, wherein the incline designates an angle of the section of the function, which is enclosed by a tangent at the point of the function with a connecting line of adjacent thread bases or thread tips.

Due to the shape described, it is possible, for example, for a larger incline or a larger angle to be present over a longer area than can be achieved, for example, in an ellipse, on the surfaces that come into contact with the thread, in particular in the area having an incline of greater than 45°. Despite previous reservations, manufacture of such a shape is easily possible. The shape can also be easily planned during design. An expansion to the thread base against the background of an improvement or reduction of stresses in the thread base can be achieved due to the shape described, while an ellipse only allows a smaller design option.

The invention provides a threaded plug on an elongated body for a threaded connection to a threaded bushing, wherein the threaded plug has a conical external thread, in which a section of a flank of the external thread can be represented as a section of a function which has a curvature, wherein the section of the function has an angle to a connecting line of adjacent thread bases or thread tips that is greater than 45° over at least a height of 0.3 times the thread height.

The term "conical (internal or external) thread" comprises a design of the (internal or external) thread such that the thread bases and/or the thread tips of the threaded plug or the threaded bushing define a jacket having a conical shape. This allows the threaded plug to be screwed together quickly and easily with the threaded bushing, wherein both threaded plug and threaded bushing preferably have a conical thread. Preferably, the angle that the jacket on which the thread bases and/or thread tips lie encloses with a parallel to the longitudinal axis of the threaded plug or threaded bushing can be an angle (cone angle), in the range between 2° and 15°, in particular 2° to 12°, in particular 3° and 12°, more preferably 3° to 10°, more preferably 3° to 8°, furthermore preferably 3° and 7°.

It is possible that to consider the cone, not all thread bases and/or thread tips are taken into consideration, but rather, for example, only two or more adjacent thread tips and/or thread bases. In this way, a slight variation of the cone and/or manufacturing tolerances over the length in the direction of the longitudinal axis of the elongated body can be taken into consideration. It is also possible for all thread bases and/or thread tips to lie on a jacket or cone.

The shape of the thread is generally considered in the sense of the description in a sectional view, in which the threaded plug or also analogously the threaded bushing is cut by a plane of section that intersects the longitudinal axis of the elongated body or contains the longitudinal axis. This allows the observation to take place in a two-dimensional representation, so that the cone angle can result from a connecting line of the thread bases or the thread tips in the sectional view; it can be provided that the cone angle is given (locally) by a connecting line of adjacent thread bases or adjacent thread tips.

In the sense of the description, the term "flank" of the thread essentially comprises the area or section of the thread between thread base and adjacent thread tip and vice versa. Due to the curved formation of the section of the flank, it can be provided that the assignment of the areas of the "thread base" and the "thread tip" are not necessarily to be reduced to a point, since thread base and/or thread tip have, for example, a plateau or an area having a very low incline. The terms "thread base" and "thread tip" are described in more detail below.

In the sense of the description, the term "section of a flank" comprises a partial area or section of the thread between a thread base and an adjacent thread tip and vice versa.

In the sense of the description, the term "section of a function" comprises a function course or (function) graph over an argument range or value range. The term "section of a function" comprises an area of a curve described by means of a function, in particular a mathematical one.

In the sense of the description, the term "function" means a figure or a relationship between two sets, which assigns to each element of the one (first) set exactly one element of the other (second) set. In the present case, a length or a point on a longitudinal axis (x value or x axis), which can be, for example, the longitudinal axis of the elongated body or a straight line connecting the thread bases, can be assigned a height of the flank (y value or y axis). In the sense of the description, the term "function" includes a unique association or relationship; one element of the first set is assigned only one element of the second set, in particular not two elements. The unique assignment or relationship can be described or expressed via a mathematical function, in particular a calculation rule. By representing a section of the flank as a function, simple planning, design, and/or manufacturing can be achieved. In particular, the term "function" may be in contrast to a parameter representation or a form that is not representable by means of a function. For example, usually and in particular in the context of this description, a circle is not representable as a function, therefore a circle section that can adjoin the section of the function for the flank is to be viewed in addition to the section of the flank that can be represented as a function. In the sense of the description, the term "function" comprises a design that is not circular.

In contrast to the prior art, the invention has recognized that the description of the flank or the representation of the flank as a function is important and has thus broken away from the concept of designing a flank, for example, essentially as an ellipse(s) and/or circle(s). The design of a flank can essentially be represented as a function that is not a circle or an ellipse. The term "function" takes into consideration the design different from a circle or multiple circles or an ellipse or multiple ellipses and/or mixed forms thereof. It cannot be ruled out that the section of the flank representable as a function is adjoined by a section designed as a circular section. In contrast to the prior art, an additional shape that may be present—for example in the form of a circular section—can be present, but can essentially be arranged in the flank where there is essentially no contact when the screw connection is loaded with the counter element.

The description of a section or an area of a flank as a section of a function can provide the advantage that slopes can be flexibly adjusted—in particular unlike circles or ellipses.

In the sense of the description, it can be provided that the section of the flank representable as a function is the section that comes into contact with the counter element in the screwed state. In particular, it can be provided that the section of the flank representable as a function has a substantial proportion of the load-bearing flank in the loaded case of the screw connection. The high proportion can be reflected in that the function extends (contiguously) over a large range between thread base and thread tip; it can be provided that the function extends over a range of essentially 0.4 to essentially 0.9 times the length between thread base and adjacent thread tip, in particular over a range of essentially 0.5 to essentially 0.9 times the length between thread base and adjacent thread tip, in particular over a range of essentially 0.6 to essentially 0.9 times the length between thread base and adjacent thread tip, in particular over a range of essentially 0.65 to essentially 0.85 times the length between thread base and adjacent thread tip, in particular contiguously.

For the purposes of the description, the term "thread base" can include the lowest point between two adjacent thread tips, from which in particular one flank can extend to one of the two adjacent thread tips. If the lowest point between two adjacent thread tips is designated as being comprised by the thread base, the thread base in the sense of the description does not have to be reduced to a single point, in particular the lowest point between two thread tips. Rather, a thread base in the sense of the description can extend over a range that is extended in the direction of the longitudinal axis of the elongated body or the threaded plug or the threaded bushing and can comprise the lowest point between two adjacent thread tips. The thread base can be plateau-shaped or formed as a plateau, wherein a slight or minor curvature can be present. A punctiform or almost punctiform design of the thread base is not excluded; in particular in the case of a punctiform or almost punctiform design, it can be provided that the thread base designed in this way is adjoined by a shape for forming a flank, which can be defined, for example, by the section of the function, a circle radius, or other parameters. It can be provided that the thread base indicates the point at which a load-bearing and a non-load-bearing flank meet.

The term "thread tip" in the sense of the description can comprise the highest point between two adjacent bases. If the highest point between two adjacent thread bases is designated as being comprised by the thread tip, the thread tip in the sense of the description does not have to be reduced to a single point, in particular the highest point between two thread bases. Rather, a thread tip in the sense of the description can extend over a range that is extended in the direction of the longitudinal axis of the elongated body or the threaded plug or the threaded bushing and can comprise the highest point between two adjacent thread bases. The thread tip can be plateau-shaped or formed as a plateau, wherein a slight or minor curvature can be present. A punctiform or almost punctiform design of the thread tip is not excluded; in particular in the case of a punctiform or almost punctiform design, it can be provided that the thread tip designed in this way is adjoined by a shape for forming a flank, which can be defined, for example, by the section of the function, a circle radius, or other parameters. It can be provided that a range is regarded as the thread tip, which can extend from a highest point to an inflection point in the flank. It can also be provided that a flank extends from the thread tip in a section of a circular shape, in particular a section of a circle having a radius, to the section of the function, so that the section of the circular shape, in particular the section of a circle having a radius, can directly adjoin the section of the function. It can be provided that the thread tip indicates the point at which a load-bearing and a non-load-bearing flank meet.

To describe the function, an X axis can be laid or positioned in such a way that the X axis is essentially a connecting line of the thread bases. It is preferred that the X axis be laid or positioned in such a way that the X axis essentially coincides with the longitudinal axis of the elongated body or extends parallel thereto. In both cases, the design, production, and/or planning can be simplified. In the latter case, it is also not necessary to tilt a function around an axis; rather the function can be used as such.

The term "(thread) height" to describe the thread comprises the specification of a distance or length relative to a plane of section for the consideration of the thread, which can contain the longitudinal axis of the elongated body. The (thread) height can result from a length or distance between thread base and adjacent thread tips, wherein a cone on which the thread tips are arranged can be taken into consideration. To determine the thread height, it can be provided that the plumb line is dropped from a connecting line connecting the thread tips to the thread base or a connecting line of adjacent thread bases.

In terms of the description, a tangent at the respective point of the flank or function is considered to consider the angle that the flank or function has with the connecting line of adjacent thread bases or thread tips.

It can be provided that the section of the function describes the flank over a large area relative to the longitudinal axis of the elongated body or the threaded plug or threaded bushing. It can be provided that the flank has essentially the section of the function, except for roundings, "supplementary parts", and/or "connecting areas". The section of the function can form a significant part of the flank. It can be provided that an area adjoining the section of the function is made as small as possible.

It is possible that the section of the function extends into the thread base. It is possible for the section of the function to describe the thread base for the corresponding flank, which can be adjoined in particular by the further flank adjacent to the thread base. The part of the thread base of the flank that the section of the function effects can be designed as the section of the function. At the thread base, up to which the section of the flank described by the section of the function can extend, a different shape can be provided for the adjacent flank having the same thread base; for example, the section of the function can adjoin the other shape in the thread base. In particular, the adjacent flank can be designed to be non-mirror-symmetrical to the flank having the section of the function. It can be provided that the section of the function can expand or extend from the area with an angle greater than 45° to the thread base. However, it is also possible to provide a different shape than the section of the function for the thread base or the area around the thread base.

If it is described that a section of the flank is designed as a section of a function, then in the sense of the description in one preferred embodiment this is understood to mean that the section of the flank has exactly the section of the function and no other shape. It can be provided that the thread between two adjacent thread tips can be composed of multiple sections of more than one function.

The shape of the thread base and the thread tip can be formed by the section of the function, a further section of a further function or shape, or multiple sections of further functions or shapes. It is possible for thread base and/or thread tip to have a shape, in particular directly adjoining the section of the function, which can be described in particular by a mathematically describable shape, preferably a circular section, more preferably a circle section.

In a preferred embodiment, the section of the function has an angle in relation to a connecting line of adjacent thread bases or thread tips which is greater than 45° over a height of at least 0.35 times, in particular at least 0.4 times, in particular at least 0.45 times, in particular at least 0.5 times, in particular at least 0.55 times, in particular at least 0.6 times, in particular at least 0.65 times, in particular at least 0.7 times, in particular at least 0.75 times, the thread height. In this way, the effect according to the invention can be varied, in particular increased.

It can be provided that an angle of the section of the function is not greater than 75°, in particular not greater than 70°, in particular not greater than 65°. In this respect, the section of the function can be restricted such that the section of the function has an angle in relation to a connecting line of adjacent thread bases or thread tips which is greater than 45° and less than 75°, in particular less than 70°, in particular less than 65° over a height of at least 0.3 times, in particular at least 0.35 times, in particular at least 0.4 times, in particular at least 0.45 times, in particular at least 0.5 times, in particular at least 0.55 times, in particular 0.5 times, in particular at least 0.6 times, in particular at least 0.65 times, in particular at least 0.7 times, in particular at least 0.75 times, the thread height. The section of the function can be designed to increase monotonically over the considered relative thread height. A derivative of the section of the function can be designed to increase monotonically over the considered relative thread height. By means of the section of the function, a large range can be created with regard to the thread height, in which the angle changes over a maximum of 20°, in particular a maximum of 25°, in particular a maximum of 30°. A contact angle can be selected, which can be varied or is varied by the function, but over a substantial range the contact angle remains in a desired range. Design and handling can be improved.

In a preferred embodiment, a length range of the section of the function, which has an angle to a connecting line of adjacent thread bases or thread tips which is greater than 45°, extends over a length between thread base and thread tip that is 0.1 times the length between thread base and thread tip of the flank, the section of which can be represented by the section of the function. In this way, not only a height of the described area can be taken into consideration, but also a length, which can be varied accordingly, in particular increased. In a particularly preferred embodiment, the length range of the section of the function, which has an angle to a connecting line of adjacent thread bases or thread tips which is greater than 45°, can extend over a length between thread base and thread tip that is 0.15 times, in particular 0.2 times, in particular 0.25 times, the length between thread base and thread tip of the flank, the section of which can be represented by the section of the function.

In the above-mentioned length range, the angle can vary up to a maximum of 75°, in particular a maximum of 70°, in particular a maximum of 65°, in particular a maximum of 60°, wherein an above-mentioned embodiment with regard to the monotonically increasing course of the section of the function and the monotonically increasing course of the derivative of the section of the function can be provided.

In the sense of the description, the term "length range" comprises an area that extends in the direction of or along a longitudinal axis of the elongated body, the threaded plug, or the threaded bushing, or in particular along a connecting line of adjacent thread bases or thread tips. If a longitudinal axis or connecting line is described with regard to the length range, the term "in the direction" or "along" designates a direction essentially parallel to the longitudinal axis or the connecting line. If a thread tip is designed as a plateau, the thread tip can be positioned or arranged or defined on or at the plateau in order to determine a length in such a way that the thread tip is a point of the flank that describes the edge of the plateau (the first point which is at the level of the plateau). The length of the plateau can be selected advantageously.

In a preferred embodiment, the section of the function extends in a range around the middle in the thread height which has at least 0.2 times the thread height, wherein the range is designed so that the angle of the section of the function in the range in relation to a connecting line of adjacent thread bases or thread tips changes by less than 20°, in particular 15°. This can further assist the core concept. In a particularly preferred embodiment, the above-mentioned range can be at least 0.25 times, in particular 0.3 times, in particular 0.35 times, in particular 0.4 times, in particular 0.45 times, in particular 0.5 times, in particular 0.55 times, in particular 0.6 times, the thread height.

When considering the section of the function in a range around the middle of the thread height, the middle is determined in this way and it is considered how far the section of the function extends from the middle to both the thread base and the thread tip in relation to the thread height. The smaller extent of the extension from middle to thread tip of middle to thread base is multiplied by two. The selected consideration can take into consideration an asymmetrical arrangement of the section of the flank. For example, the height of the section that adjoins the function at the thread base can be significantly smaller—or not present at all—than the height of the section that can adjoin in the direction of the thread tip.

In the above-mentioned range of the thread height, the angle can vary up to a maximum of 75°, in particular a maximum of 70°, in particular a maximum of 65°, wherein an above-mentioned embodiment with regard to the monotonically increasing course of the section of the function and the monotonically increasing course of the derivative of the section of the function can be provided.

It can be provided that the specifications on the extension of the section of the flank, which can be described by means the function, complement one another in such a way that the function extends over a length range and a thread height, so that a ratio of extension over thread height and extension over length range results, which is in the range from 1 to 4. There can be a synergistic effect here in that the extension ratio is correlated with the angle that is achieved with the function for contact formation.

A ratio of extension over thread height and extension over length range can be selected, which is in particular in the range from 1 to 4, more preferably 1.2 to 4, more preferably 1.3 to 3.9, more preferably 1.3 to 3.8, more preferably 1.3 to 3.7, more preferably 1.3 to 3.6, more preferably 1.3 to 3.5, more preferably 1.3 to 3.4, more preferably 1.3 to 3.3, more preferably 1.3 to 3.2, more preferably 1.3 to 3.1, more preferably 1.3 to 3.0, more preferably 1.3 to 2.9, more preferably 1.3 to 2.8, more preferably 1.3 to 2.7, more preferably 1.3 to 2.6, more preferably 1.3 to 2.5, more preferably 1.3 to 2.4, more preferably 1.3 to 2.3, more preferably 1.3 to 2.2, more preferably 1.3 to 2.1, more preferably 1.3 to 2.0, more preferably 1.4 to 2.0, more preferably 1.5 to 2.0. It can be provided that the ratio 1.0 is correlated with 45°, the ratio 4.0 with 75°, the ratio 1.5 with 56°, and the ratio 2.0 with 63°.

In a preferred embodiment, the flank extends over a length from the thread base in the direction of a thread tip over a range, in which the angle in relation to a connecting line of adjacent thread bases or thread tips is less than 20°, which is greater than 0.1 times, in particular 0.15 times, in particular 0.2 times, in particular 0.25 times, in particular 0.3 times, in particular 0.35 times, in particular 0.4 times, the length between thread base and thread tip of the flank, the section of which can be represented by the section of the function. In this way, the core concept of the invention can be improved or further strengthened by being able to counteract the notch effect on the thread base. A synergistic effect can result.

In a preferred embodiment, the section of the function extends into the area of the thread base, in particular into the thread base, wherein the function can embody the properties described in the description. This can result in a synergistic effect that the described properties can be implemented with the function, which enables good planning or construction and good producibility.

In a preferred embodiment, the curvature is curved inward, due to which the inward curvature previously designed for the elliptical shape can be retained conceptually.

For the purposes of the description, the term "inwardly bulging" or "inwardly curved" or "convex" is to be understood as meaning a configuration in which the shape is such that the shape is below one or each section of a connection between two points of the shape.

In a preferred embodiment, the flank, the section of which can be represented as a section of the function, has the section of the function and a further shape that connects the section of the flank to the thread tip. This allows a certain degree of variability to be achieved. It can be provided that the flank can have other, different areas or shapes in addition to the section of the function. It can be provided that the flank has or consists of exactly one section of the function and exactly one further shape. Simple planning or design is possible in addition to good producibility.

In a preferred embodiment, the section of the function is continuous. This can counteract a notch effect. The constant course also means that a simple design with good production is possible.

It can be provided that the section of the function is a section of a hyperbolic function. In particular, the hyperbolic function can be rotated by approximately 45°, in particular 45° reduced by the cone angle.

In a preferred embodiment, the function is a power function having an exponent less than 1 and a base having an exponentiated argument. Despite their surprising use, such functions are well known in this field and are variable within a certain range in such a way that very good results can be achieved.

In the sense of the description, the term power function having an exponent less than 1 basically comprises a function of the form $$f1(x) = (\text{factor}^* x^\wedge \text{power} +/- \text{adjustment})^\wedge \text{exponent} +/- \text{shift},$$

wherein factor is a real number,
power is a real number,
adjustment is a real number,
exponent is a real number less than 1, and
shift is a real number.

In a preferred embodiment, the exponent is in the range from 0.2 to 0.7, in particular from 0.3 to 0.6, and/or the base that is raised to a power has a term in which the argument is raised to a power which is in the range between 2.5 and 5.8, in particular between 2.7 and 5.6, in particular between 2.9 and 5.4. This makes it possible to use a function that has a relatively simple structure and nonetheless allows for a design and/or variability that underlines or assists the core concept of the invention.

The flanks of the thread can be differentiated into load-bearing flanks and non-load-bearing flanks. The load-bearing flanks are responsible for transmitting force from the threaded plug to the threaded bushing. A load-bearing flank is directly adjacent to a non-load-bearing flank, i.e., a load-bearing flank and an adjacent, non-load-bearing flank are connected to one another by means of exactly one thread base arranged between them or a thread tip arranged between them.

In a preferred embodiment, the flank is a load-bearing flank. It can be made possible to distinguish between a load-bearing flank and a non-load-bearing flank, by which a design assisting the core concept of the invention can be further improved. In particular, a different design can be selected for the load-bearing flank than for the non-load-bearing flank.

In an independent aspect of the invention, a threaded plug can be provided on an elongated body for a threaded connection to a threaded bushing. The threaded plug has a conical external thread and can be designed as above, but an initially independent design can also be particularly preferably considered, wherein a non-load-bearing flank of the thread has a section of a function that is curved outward over an area around the middle between thread base and thread tip. It was recognized that a non-load-bearing flank can meet other requirements and thus not a simply symmetrical design of the thread can be provided, in which in particular the non-load-bearing flank of the thread of the threaded plug can have an outwardly curved area.

An outwardly curved area represents a departure from the usual shape in view of the previous prevailing opinion, since an inwardly curved shape was previously provided.

In a preferred embodiment, the function of the section of the function for the non-bearing flank has a logarithm.

General comments on the design of the load-bearing flank, in particular with regard to the representation of a section of the flank by means of a function, also apply to the non-load-bearing flank. This applies in particular to the difference between a function and a description of a circle or section of a circle and/or an ellipse or section of an ellipse.

In the sense of the description, a function that has a logarithm is understood to mean a function that has a logarithmic course or has a section of a logarithmic spiral.

In a preferred embodiment, the section of the function for the non-load-bearing flank extends over a height of at least 0.35 times, in particular at least 0.4 times, in particular at least 0.45 times, in particular at least 0.5 times, in particular at least 0.55 times, in particular at least 0.6 times, in particular at least 0.65 times, in particular at least 0.7 times, the thread height, by which the design, the producibility, and/or the use can be improved. The advantageous property can extend over a large range of the thread height.

In a preferred embodiment, a length range of the section of the function for the non-load-bearing flank extends over a length between thread base and thread tip, which is 0.2 times the length between thread base and thread tip of the flank, the section of which can be represented by the section of the function the non-load-bearing flank. In this way, not only a height of the described area can be taken into account, but also a length, which can be varied accordingly, in particular increased. In a particularly preferred embodiment, the length range of the section of the function of the non-load-bearing flank can extend over a length between thread base and thread tip that is 0.25 times, in particular 0.3 times, in particular 0.35 times, in particular 0.4 times, in particular 0.45 times, the length between thread base and thread tip of the non-load-bearing flank.

In a preferred embodiment, the section of the non-load-bearing flank function extends in a range around the middle in the thread height that is at least 0.25 times the thread height. In a particularly preferred embodiment, the above-mentioned range can be at least 0.3 times, in particular 0.35 times, in particular 0.4 times, in particular 0.45 times, in particular 0.5 times the thread height.

When considering the section of the function for the non-load-bearing flank, the same procedure is used as for the, in particular load-bearing, flank discussed above. The middle is defined and we look at how far the section of the function extends from the middle to both the thread base and the thread tip in relation to the thread height. The smaller amount of the extension from the middle to the thread tip or the middle to the thread base is multiplied by two.

In a particularly preferred embodiment, a "function having a logarithm" is understood to mean a function in which the argument, which may be (existing) part of a term, is logarithmic. A logarithm having any base is possible, as is a decadal or natural logarithm.

It can be provided that the function having a logarithm has a basic form given by $$f2(x) = \text{Multiplier 1} * \ln(+/-\text{Multiplier 2}^* x + \text{Shift 1}) + \text{Shift 2}$$

can be given,
wherein Multiplier1 is a real number,
Multiplier2 is a real number,
Shift1 is a real number, and
Shift2 is a real number.

In a preferred embodiment, the section of the function of the non-load-bearing flank begins at a distance from the thread base and the distance between thread base and the beginning of the section of the function is bridged by means of an arc-shaped, in particular a circular arc-shaped, section, which is particularly preferably a circular arc. As a result, a simple design having a relatively simple function can be used, which enables variability in order to enable an adaptation or a compromise to different requirements.

In a particularly preferred embodiment, a circular arc-shaped section, in particular a circular arc segment, is present on the non-load-bearing flank of the thread base, which is adjoined by the section of the function. In a particularly preferred embodiment, the section of the function for the non-load-bearing flank is adjoined by a circular arc-shaped section, in particular a circular arc segment, which extends to the thread tip. In a particularly preferred embodiment, the non-load-bearing flank can be represented or described by means of the section of the function, a circular arc-shaped section, in particular a circular arc segment, which extends from the section of the function to the thread base, and a circular arc-shaped section, in particular a circular arc segment, which extends from the section of the function to the thread tip.

In a particularly preferred embodiment, a thread between two adjacent thread bases or two adjacent thread tips can have a load-bearing flank described in the description and a non-load-bearing flank described in the description. A synergistic effect can result in this way.

It is possible that the design of the thread having the non-load-bearing flank described and the load-bearing flank described results in a synergistic effect that improves sliding. Alternatively or additionally, it can be achieved that alignment errors can be compensated for by the machine. Alternatively or additionally, better centering can be enabled when screwing in.

In a preferred embodiment, the elongated body is a rod section of a drill string for an earth drilling device or a drive element for a rod section of a drill string of an earth drilling device. As a result, the described embodiments of threaded plug and/or threaded bushing can be used in an area that has to meet high requirements. In particular, increased stability and durability can be made possible in the area mentioned having the high loads.

The term "rod section" in the sense of the description includes individual, in particular rigid, rod sections which can be connected directly or indirectly to one another and which can be connected to one another in the longitudinal axial direction to form a drill rod or a drill string. For connection to one another, the rod sections can be screwed together with the mechanical interconnection of an intermediate element or without the interconnection of an intermediate element using a described threaded bushing having a threaded plug. A rod section does not necessarily have to have an element for a screw connection at both longitudinal ends, so it is possible for the rod section to have i) a threaded bushing at one longitudinal end and a threaded plug at the other longitudinal end, ii) a threaded bushing at each longitudinal end, iii) one threaded bushing at one longitudinal end and a different type of coupling element at the other longitudinal end.

The term "drill string" in the sense of the description comprises multiple interconnected rod sections. Boring can be carried out by means of a boring string, which can have a boring head at its front end and an optionally provided boring head tip, which can be designed as a boring tool (for example as an expansion head).

The term "earth drilling device" in the sense of the description comprises one (and thus any) device which, in particular, can move a drill string having rod sections in a channel, which is already existing or has to be created, in particular in the ground, in order to create or widen a bore, in particular a horizontal bore (HD), or pull pipelines or other long bodies into the ground. The earth drilling device can in particular be an HD device. An earth drilling device can be a device that drives a drill string and that can work in particular by displacing soil. The drill string can be translationally and/or rotationally introduced into the ground in the longitudinal axial direction of the drill string. The drill string can be moved in the ground by applying tension or pressure and possibly also rotationally or by turning.

In the sense of the description, the term "drive element" comprises an element arranged on the earth drilling device, which is designed to be connected to a drill string or a rod section of the drill string in order to exert a translational and/or rotational force on the drill string. Usually, a rod section to be connected to the drill string is brought into engagement with the drive element in order to then connect the rod section connected to the drive element to the drill string that has already been drilled.

The invention also provides a threaded bushing on an elongated body for a threaded connection to a threaded plug, wherein the threaded bushing has a conical internal thread, in which a section of a flank of the internal thread can be represented as a section of a function which has a curvature, wherein the section of the function has an angle to a connecting line of adjacent thread bases or thread tips that is greater than 45° over at least a height of 0.2 times the thread height. A threaded bushing complementary to the threaded plug can be created.

Just as for the threaded plug, preferred embodiments for the threaded bushing are possible with regard to the design of the shape, in particular a complementary design or a design of the thread corresponding to the threaded plug having similar advantages.

The invention also creates, in an aspect independently relating to a patent-establishing invention, a threaded bushing which is designed for a threaded connection to a threaded plug. The threaded bushing can have the properties described above, but can also be designed independently of the above-mentioned threaded bushing. A non-load-bearing flank of the internal thread has a section of a function that is curved inward over an area around the middle between the thread base and the thread tip.

Preferred embodiments for the threaded bushing with regard to the design of the shape, in particular a complementary design or a design of the thread corresponding to the threaded plug, with similar advantages are also possible for the threaded bushing, which concerns an aspect that independently establishes patentability.

The invention also provides a threaded connection having a threaded plug described in the description and a threaded bushing described in the description. By designing both threaded plug and threaded bushing having a shape that is adapted to the other design, the core concept of the invention can be assisted or further improved.

The invention also provides a use of a threaded plug or a threaded bushing described in the description for a threaded connection to a threaded bushing or a threaded plug. The threaded plug has an external thread or the threaded bushing has an internal thread, in which a section of a flank of the external thread or the internal thread can be represented as a section of a function that has a curvature, wherein the section of the function has an angle that is greater than 45° to a connecting line of adjacent thread bases or thread tips over a height of at least 0.2 times the thread height.

A tensioning of the threaded bushing against a shoulder on the threaded plug can be provided. Threaded plug and threaded bushing can be brought into contact with one another using end faces, so that a force screw connection takes place between an end face of the shoulder and the load-bearing flanks, in particular those in the area near the shoulder. The shoulder or the end face on the threaded plug can alternatively or additionally be used as a maximum stop for the screw connection. Axial forces and/or torsional torques can also be transmitted by means of the shoulder or the end face(s).

In one preferred embodiment, the end face angle of the end faces of the threaded plug and the threaded bushing, which can come into contact with one another, is in the range of 65° to 90°, in particular in the range of 65° to 80°.

If the invention is described by means of different embodiments and/or aspects (regarding, for example, a device-related or usage-related design), the descriptions of the individual designs or aspects complement each other. In particular, the statements regarding the threaded plug can also apply to the threaded bushing and vice versa. In particular, the statements regarding threaded plug and/or threaded bushing can also apply to the aspect of "use". The statements regarding the geometry of the thread, the elongated body connected thereto, a rod section and the like also apply to the aspect of a threaded connection in which, in addition to the threaded bushing described, there is also a described threaded plug.

It has been shown that a threaded plug, which is designed as described in the description, can also cooperate to a certain extent with a threaded bushing if the threaded bushing is not designed to be complementary or corresponding to the threaded plug. The same applies to the interaction of a threaded bushing, which is designed as described in the description, with a threaded plug. However, it was also recognized that a mutually corresponding or complementary design of the threaded plug and threaded bushing may be preferred.

In a preferred embodiment, the thread pitch of the threaded bushing and/or the threaded plug is between 5 mm and 9 mm, preferably 7 mm.

In a preferred embodiment, the lead angle is between 20° and 30°.

In a preferred embodiment, the lead dimension of the threaded plug is at least 0.5 mm.

In a preferred embodiment, the lead dimension of the threaded bushing is at least 1 mm.

In a preferred embodiment, the difference between the length dimension of the threaded plug and the threaded bushing is at most 0.5 mm.

In the following, the invention will be explained in greater detail with reference to an exemplary embodiment illustrated in the drawings.

In the drawings:

FIG. 4 shows an enlarged detail from FIG. 3, with further geometric data indicated.

Figure 1:
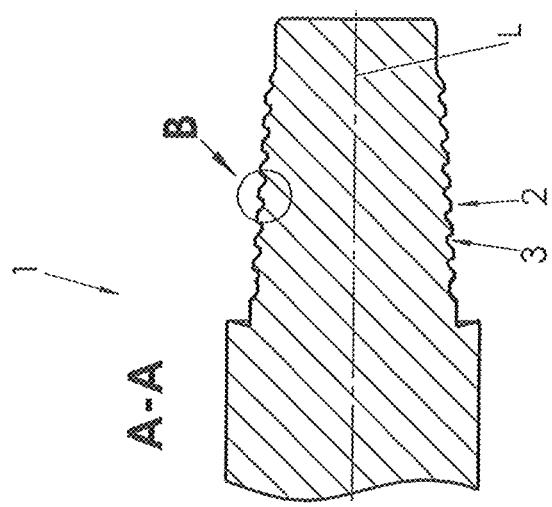
FIG. 1 shows a partial section through a threaded plug.
Figure 1:
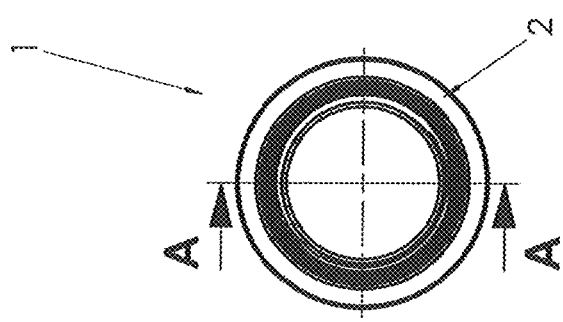

FIG. 1 shows in the right of the two representations a section of an elongated body 1 having a threaded plug 2 having an external thread 3 in a sectional view. The threaded plug 2 is located at the end on the elongated body 1, which is designed as a rod section of a drill string for an earth drilling device or a drive element for a pipe section of a drill string of an earth drilling device.

The right of the two representations in FIG. 1 is a sectional representation of the left representation in FIG. 1 along A-A. The left of the two representations in FIG. 1 shows a view of the threaded plug 2 of the elongated body 1 in the longitudinal direction of the elongated body 1.

The elongated body 1 has a longitudinal axis L. The external thread 3 of the threaded plug 2 is a conical external thread. The external thread 3 of the threaded plug 2 is shown in an enlarged view in FIG. 2.

Figure 2:
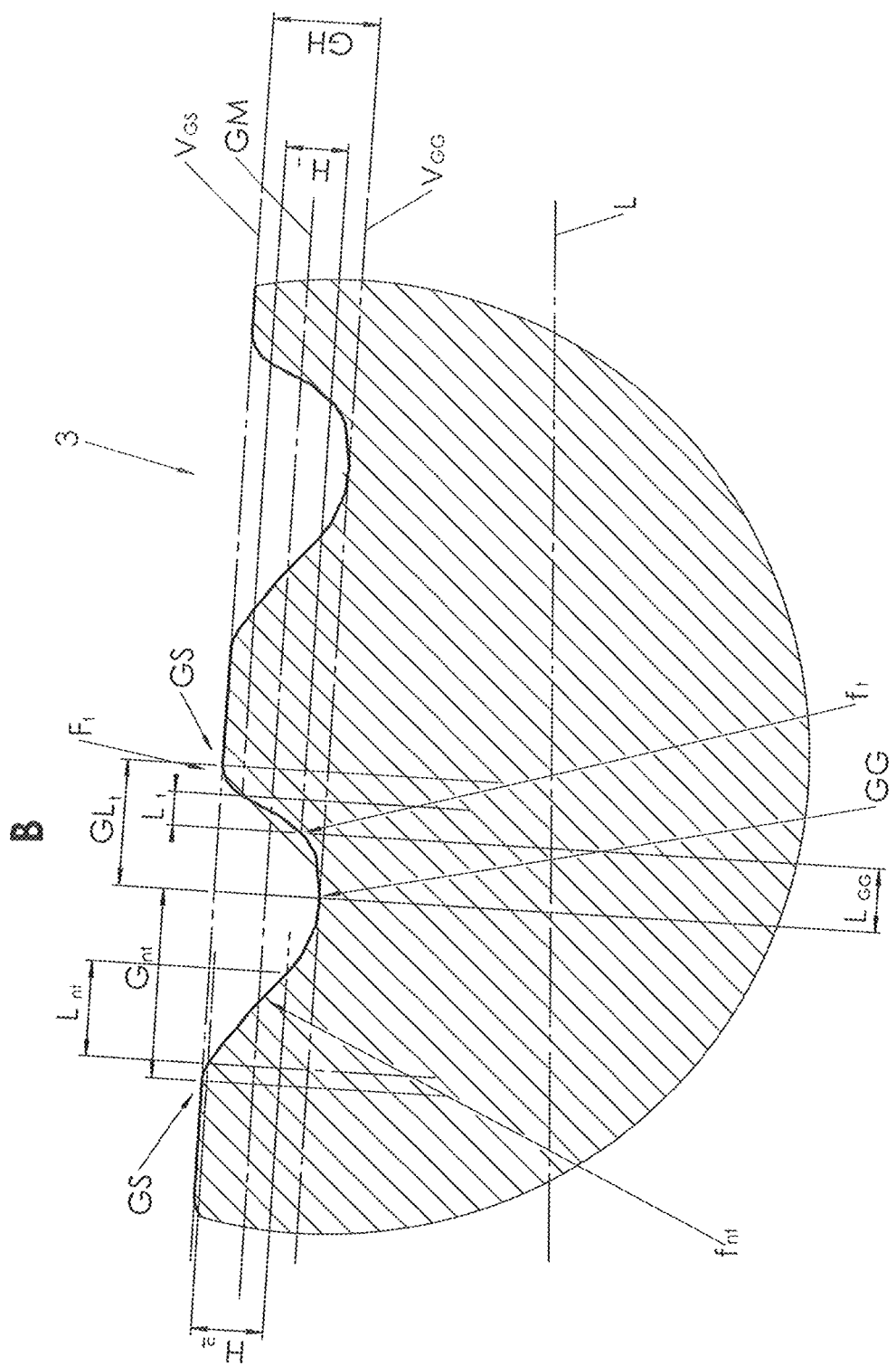
FIG. 2 shows an enlarged detail from FIG. 1, in which additional geometric data are drawn.

FIG. 2 shows the external thread 3 having the dimensions applicable to the exemplary embodiment. Thread bases GG and thread tips GS are marked in the thread 3 of the threaded plug 2. The thread bases GG are located on a connecting line $V_{GG}$ of adjacent thread bases GG. The thread tips GS are located on a connecting line $V_{GS}$ of adjacent thread tips GS. In the exemplary embodiment shown, the connecting line $V_{GG}$ is parallel to the connecting line $V_{GS}$. The thread height is designated GH and indicates the length or the distance between thread base GG and thread tip GS.

A thread has a load-bearing flank and a non-load-bearing flank. The load-bearing flank extends from the thread base GG to the adjacent thread tip GS and is arranged to the right of the thread base GG in the illustration in FIG. 2. The non-load-bearing flank extends to the left from the thread base GG to the adjacent thread tip GS.

In the exemplary embodiment shown, the load-bearing flank has a section representable by means of a function $f_t$. The function $f_t$ has a curvature. The section of the function $f_t$ has an angle, which is greater than 45°, to the connecting line $V_{GG}$ or $V_{GS}$ of adjacent thread bases GG or thread tips GS over a height $H_t$ of at least 0.3 times the thread height GH.

Furthermore, a length range $L_t$ of the section of the function $f_t$ in which the function $f_t$ has an angle to the connecting line $V_{GG}$ or $V_{GS}$ of adjacent thread bases GG or thread tips GS that is greater than 45° is indicated. The length range or the length $L_t$ extends over at least 0.1 times the length between thread base GG and thread tip GS of the load-bearing flank.

The section of the function $f_t$ extends in a range around the middle GM in the thread height GH which has at least 0.3 times the thread height GH, wherein the range is designed so that the angle of the section of the function $f_t$ in the range in relation to a connecting line of adjacent thread bases GG or thread tips GS changes by less than 30°.

In the exemplary embodiment shown, the flank extends from the thread base GG over a length $L_{GG}$ in the direction of a thread tip GS, in which the angle to a connecting line of adjacent thread bases GG or thread tips GS is less than 20°, and the length $L_{GG}$ is greater than that 0.1 times the length $GL_t$ between thread base GG and thread tip GS of the load-bearing flank, the section of which is represented by the section of the function $f_t$.

The function $f_t$ extends from the thread base GG to the right edge of the length designated by $L_t$. The function $f_t$ is adjoined by a further shape $F_t$, which in the exemplary embodiment shown is a circular arc-shaped segment.

In the exemplary embodiment shown, the load-bearing flank is therefore composed of the section of the function $f_t$ and a circular arc-shaped segment $F_t$ between function $f_t$ and thread tip GS.

In the exemplary embodiment shown, the non-load-bearing flank is composed of three shapes. The first shape is a circular arc-shaped segment that extends from the thread base GG to the left to the right edge of the area $L_{nt}$. The circular arc-shaped segment is adjoined by an area that is represented by a function $f_{nt}$. The height over which the function $f_{nt}$ extends is given by $H_{nt}$. The section is designed as a function having an outward curvature. The function $f_{nt}$ is adjoined by a circular arc-shaped segment up to the thread tip GS.

A thread of the exemplary embodiment of the threaded plug 2 shown in the figures comprises, in addition to the load-bearing flank and the non-load-bearing flank, also at least partially the plateau at the level of the connecting line $V_{GS}$. For example, the thread of FIG. 2, which is provided with the designations for the dimensions, can comprise a plateau adjoining one of the two thread tips GS to the next adjacent thread tip GS.

Figure 3:
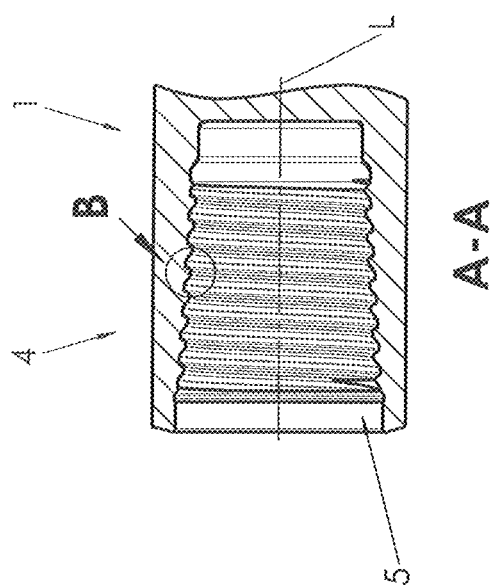
FIG. 3 shows a threaded bushing corresponding to the threaded plug of FIG. 1 in one embodiment.
Figure 3:
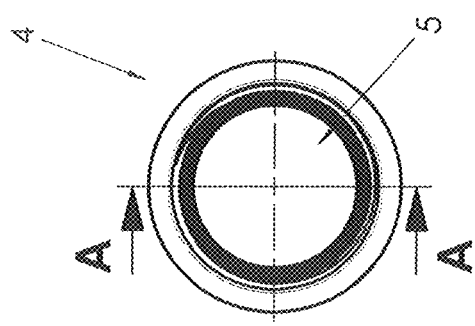

FIG. 3 shows, in the right of the two representations, a section of an elongated body 1 having a threaded bushing 4 having an internal thread 5. The threaded plug 4 is located at the end on the elongated body 1, which is designed as a rod section of a drill string for an earth drilling device or a drive element for a pipe section of a drill string of an earth drilling device.

The right of the two representations in FIG. 3 is a sectional representation of the left representation in FIG. 3 along A-A. The left of the two representations in FIG. 1 shows a view of the threaded bushing 2 of the elongated body 1 in the longitudinal direction of the elongated body 1.

The elongated body 1 has a longitudinal axis L. The internal thread 3 of the threaded bushing 2 is a conical internal thread. The internal thread 3 of the threaded bushing 2 is shown in an enlarged view in FIG. 2.

FIG. 4 shows an enlarged view of the internal thread 5, which is designed as complementary to the external thread 3 of the threaded plug 2. The dimensions indicated in FIG. 4 essentially correspond to the dimensions in FIG. 2.

The invention claimed is:

1. A threaded plug on an elongated body for a threaded connection to a threaded bushing, wherein the threaded plug has a conical external thread, in which a section of a flank of the external thread can be represented as a section of a function which has a curvature, wherein the section of the function has an angle to a connecting line of adjacent thread bases or thread tips that is greater than 45°, over a height of at least 0.3 times a thread height, wherein the function is a power function having an exponent less than 1 and a base having an exponentiated argument.

2. The threaded plug according to claim 1, wherein the section of the function has an angle in relation to a connecting line of adjacent thread bases or thread tips which is greater than 45°, over a height of at least 0.35 times the thread height.

3. The threaded plug according to claim 1, wherein a length range of the section of the function which has an angle to a connecting line between adjacent thread bases or thread tips which is greater than 45° extends over a length between the thread base and the thread tip, which is 0.1 times the length between the thread base and the thread tip of the flank, the section of which can be represented by the section of the function.

4. The threaded plug according to claim 1, wherein the section of the function extends in a range around a middle in the thread height which is at least 0.3 times the thread height, wherein the range is designed so that the angle of the section of the function in the range in relation to a connecting line between adjacent thread bases or thread tips changes by less than 30°.

5. The threaded plug according to claim 1, wherein the flank extends from a thread base over a length in the direction of a thread tip, in which the angle to a connecting line of adjacent thread bases or thread tips is less than 20°, and the length in the direction of a thread tip is greater than 0.1 times a length between the thread base and the thread tip of a load-bearing flank, a section of which can be represented by the section of the function.

6. The threaded plug according to claim 1, wherein the section of the function extends into the area of the thread base.

7. The threaded plug according to claim 1, wherein the curvature is curved inward.

8. The threaded plug according to claim 1, wherein the flank, the section of which can be represented as a section of the function, has the section of the function and a further shape, which connects the section of the flank to the thread tip.

9. The threaded plug according to claim 1, wherein the function is continuous.

10. The threaded plug according to claim 1, wherein the exponent is in the range from 0.3 to 0.7 and/or the base has a term in which the argument is raised to the power of a number which is in the range between 2.5 and 5.8.

11. The threaded plug according to claim 1, wherein the flank is a load-bearing flank.

12. The threaded plug on an elongated body for a threaded connection to a threaded bushing, wherein the threaded plug has a conical external thread, in particular according to claim 1, wherein a non-load-bearing flank of the thread has a section of a function which is curved outward over a range around a middle between the thread base and the thread tip.

13. The threaded plug according to claim 12, wherein the function of the non-load-bearing flank has a logarithm.

14. The threaded plug according to claim 12, wherein the section of the function of the non-load-bearing flank begins at a distance from the thread base, and the distance between thread base and the beginning of the section of the function is bridged by means of an arc-shaped section.

15. The threaded plug according to claim 1, wherein the elongated body is a rod section of a drill string for an earth drilling device or a drive element for a rod section of a drill string of an earth drilling device.

16. A threaded connection comprising a threaded plug according to claim 1 and a threaded bushing.

17. A threaded bushing on an elongated body for a threaded connection to a threaded plug, wherein the threaded bushing has a conical internal thread, in which a section of a flank of the internal thread can be represented as a section of a function which has a curvature, wherein the section of the function has an angle to a connecting line of adjacent thread bases or thread tips that is greater than 45°, over a height of at least 0.3 times a thread height,
wherein the function is a power function having an exponent less than 1 and a base having an exponentiated argument.

18. The threaded bushing on an elongated body for a threaded connection to a threaded plug according to claim 17, wherein a non-load-bearing flank of the internal thread has a section of a function, which is curved inward over a range around a middle between the thread base and the thread tip.

19. A use of a threaded plug or a threaded bushing for a threaded connection to a threaded bushing or a threaded plug, wherein the threaded plug has an external thread or the threaded bushing has an internal thread, in which a section of a flank of the external thread or of the internal thread can be represented as a section of a function which has a curvature, wherein the section of the function has an angle to a connecting line of adjacent thread bases or thread tips that is greater than 45°, over a height of at least 0.3 times a thread height,
wherein the function is a power function having an exponent less than 1 and a base having an exponentiated argument.

* * * * *